United States Patent
Pazhyannur et al.

(10) Patent No.: US 8,990,916 B2
(45) Date of Patent: Mar. 24, 2015

(54) SYSTEM AND METHOD FOR SUPPORTING WEB AUTHENTICATION

(75) Inventors: Rajesh S. Pazhyannur, Milpitas, CA (US); Kent K. Leung, Palo Alto, CA (US); Srinath Gundavelli, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 13/554,873

(22) Filed: Jul. 20, 2012

(65) Prior Publication Data

US 2014/0026206 A1 Jan. 23, 2014

(51) Int. Cl.
- G06F 9/00 (2006.01)
- H04W 12/06 (2009.01)
- H04W 4/12 (2009.01)
- H04W 80/06 (2009.01)

(52) U.S. Cl.
CPC ............ *H04W 12/06* (2013.01); *H04W 4/12* (2013.01); *H04W 80/06* (2013.01)
USPC ........................................... 726/12

(58) Field of Classification Search
USPC ........................................... 726/12
See application file for complete search history.

(56) References Cited

U.S. PATENT DOCUMENTS

| | | | |
|---|---|---|---|
| 6,542,491 B1 | 4/2003 | Tari et al. | |
| 7,039,688 B2 | 5/2006 | Matsuda et al. | |
| 7,536,464 B1 | 5/2009 | Dommety et al. | |
| 7,577,723 B2 | 8/2009 | Matsuda et al. | |
| 8,019,346 B2 | 9/2011 | Sachs et al. | |
| 8,023,469 B2 | 9/2011 | Sachs et al. | |
| 8,285,875 B2 | 10/2012 | Gandhewar et al. | |
| 2002/0133573 A1 | 9/2002 | Matsuda et al. | |
| 2004/0242195 A1* | 12/2004 | Chun et al. | 455/410 |
| 2006/0036733 A1 | 2/2006 | Fujimoto et al. | |
| 2006/0155833 A1 | 7/2006 | Matsuda et al. | |
| 2008/0205345 A1 | 8/2008 | Sachs et al. | |
| 2009/0040964 A1* | 2/2009 | Zhao et al. | 370/328 |
| 2009/0131053 A1 | 5/2009 | Sachs et al. | |
| 2009/0285179 A1 | 11/2009 | Jones et al. | |
| 2010/0191839 A1 | 7/2010 | Gandhewar et al. | |
| 2010/0199332 A1* | 8/2010 | Bachmann et al. | 726/4 |
| 2011/0211574 A1* | 9/2011 | Li et al. | 370/352 |
| 2011/0255471 A1 | 10/2011 | Sundell et al. | |
| 2012/0079271 A1* | 3/2012 | Cordeiro et al. | 713/166 |
| 2012/0201222 A1* | 8/2012 | Muhanna et al. | 370/331 |

OTHER PUBLICATIONS

USPTO Aug. 21, 2013 Final Office Action from U.S. Appl. No. 13/305,010.
USPTO May 20, 2014 Non-Final Office Action from U.S. Appl. No. 13/305,010.
EPO Nov. 22, 2012 European Search Report and Written Opinion from EP Application No. 12169631.4.

(Continued)

*Primary Examiner* — Mohammad W Reza
(74) *Attorney, Agent, or Firm* — Patent Capital Group

(57) ABSTRACT

A method is provided in one example embodiment and includes receiving a discover message over a network; determining that the discover message is associated with an unauthenticated client (e.g., identifying a media access control (MAC) address); communicating a proxy binding update (PBU) having a binding type value set to a temporary status; and establishing a bidirectional tunnel for transporting traffic for the client.

17 Claims, 4 Drawing Sheets

(56) References Cited

OTHER PUBLICATIONS

Taaghol P et al: "Seamless integration of mobile WiMAX in 3GPP networks", Oct. 1, 2008, pp. 74-85.
"Universal Mobile Telecommunications System (UMTS); LTE; Architecture enhancements for non-3GPP accesses (3GPP TS 23.402 version 10.5.0 Release 10)", Oct. 1, 2011.
Intel et al: "Solution for Trusted WLAN access to EPC", 3GPP Draft S2-113148V2, Jul. 5, 2011.
Alcatel-Lucent: "Solution for Trusted WLAN w/o UE impact", 3GPP Draft S2-111627, Apr. 6, 2011.
"Presentation of SaMOG", 3GPP Draft 3BF-11039_WAS JBF-11004-SAMOG, Nov. 3, 2011.
USPTO Sep. 2, 2014 Final Office Action from U.S. Appl. No. 13/305,010.
"3rd Generation Partnership Project: Technical Specification Group Services and System Aspects:; Architecture Enhancements for non-3GPP Accesses (Release 10)," Sep. 2010, 3 GPP TS 23.402 V 10.1.0, Technical Specification, Version 10.
USPTO Feb. 12, 2013 Non-Final Office Action from U.S. Appl. No. 13/305,010.
USPTO May 13, 2013 Response to Non-Final Office Action dated Feb. 12, 2013 from U.S. Appl. No. 13/305,010.
U.S. Appl. No. 13/305,010, filed Nov. 28, 2011, entitled "System and Method for Extended Wireless Access Gateway Service Provider Wi-Fi Offload," Inventors: Marco C. Centemeri, et al.
3 GPP Organizational Partners, "3rd Generation Partnership Project: Technical Specification Group Services and System Aspects; Architecture Enhancements for non-3GPP Accesses (Release 11)," 3 GPP TS 23.402 V11.0.0 (Sep. 2011) © 2011, 232 pages.
3 GPP Organizational Partners, "3rd Generation Partnership Project: Technical Specification Group Services and System Aspects; Study on S2a Mobility Based on GTP & WLAN Access to EPC (SaMOG); Stage 2 (Release 11)," 3 GPP TR 23.852 V0.4.0 (Oct. 2011) © 2011, 38 pages.

* cited by examiner

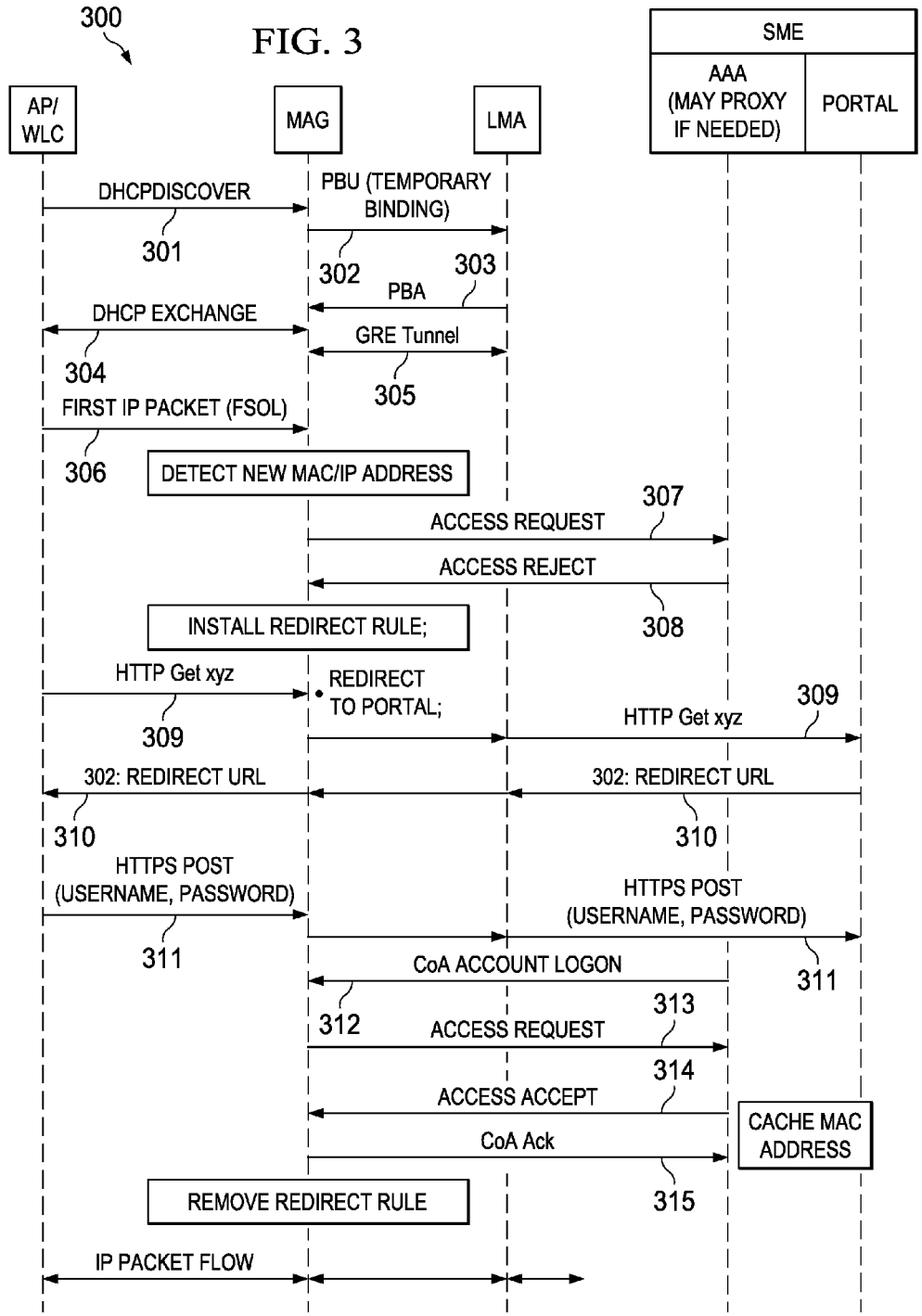

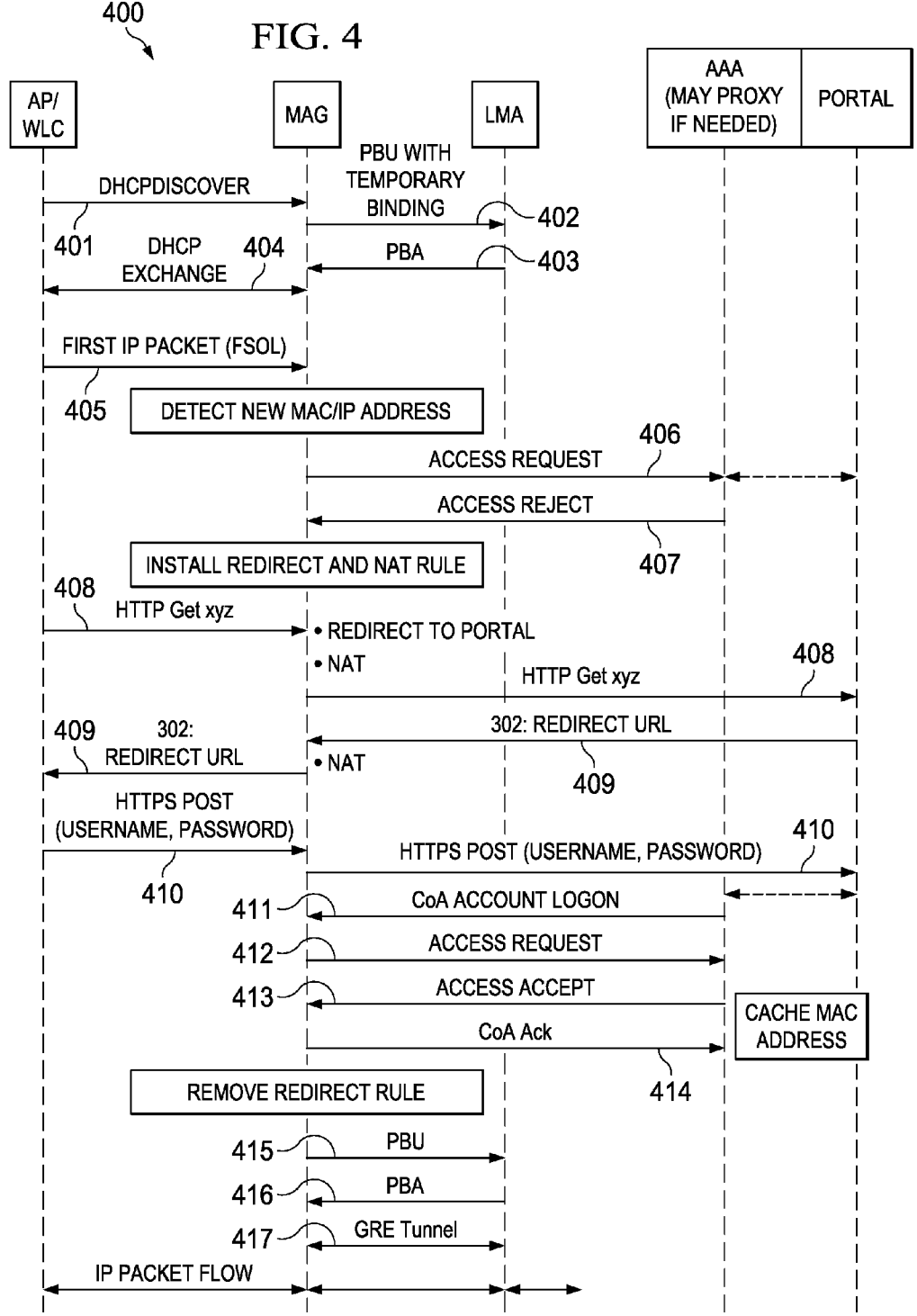

SYSTEM AND METHOD FOR SUPPORTING WEB AUTHENTICATION

TECHNICAL FIELD

This disclosure relates in general to the field of communications and, more particularly, to a system and a method for supporting web authentication.

BACKGROUND

Networking architectures have grown increasingly complex in communications environments, particularly mobile wireless environments. Wireless communication technologies are used in connection with many applications, including satellite communications systems, portable digital assistants (PDAs), laptop computers, mobile devices (e.g., cellular telephones, user equipment), etc. Wireless communication technologies are handling increasing amounts of data traffic volume, and the types of data being transported through mobile wireless networks have changed dramatically. This is in part because mobile devices are becoming more sophisticated and, further, are able to engage in more data-intensive activities such as displaying movies or playing video games. Video, file-sharing, and other types of usages (more traditionally associated with wired networks) have been gradually displacing voice as the dominant traffic in mobile wireless networks. There is a significant challenge for mobile operator providers to maintain a relationship with subscribers when they access Wi-Fi networks.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which:

FIG. 3 is a simplified flow diagram illustrating possible example details associated with the communication system; and FIG. 4 is a simplified flow diagram illustrating potential operations associated with the communication system.

DETAILED DESCRIPTION OF EXAMPLE EMBODIMENTS

Overview

A method is provided in one example embodiment and includes receiving a discover message over a network and determining that the discover message is associated with an unauthenticated client. This determination could involve simply identifying a media access control (MAC) address. The method also includes communicating a proxy binding update (PBU) having a binding type value set to a temporary status (which can be any suitable identifier, setting, etc. indicative of the binding being temporary). The method also includes establishing a bidirectional tunnel for transporting traffic for the client. The temporary binding is for Internet Protocol (IP) address assignment to satisfy the need for the client to have an IP address during web authentication. No tunnel between mobile access gateway (MAG) and local mobility anchor (LMA) would be established as to prevent traffic into the home network until authentication succeeds.

In particular embodiments, a network address translation (NAT) function can be used to enable the client to communicate with the captive portal. The client can obtain an Internet Protocol (IP) address from the LMA, for example, in the home network. This IP address is topologically incorrect to be used in the access network. During web authentication, the gating function performs NAT on the client's packets exchanged with the captive portal. This scheme enables access network-based web authentication for the client that has an IP address in the home network.

In other embodiments, the method can include confirming a temporary proxy mobile Internet protocol PMIP binding previously established, where the PBU contains an Internet protocol (IP) address previously received. In addition, the PBU can include a Generic Routing Encapsulation (GRE) key option for GRE encapsulation. A set of upstream and downstream GRE keys can be used to mark upstream and downstream traffic for a mobility session associated with the client. Note that this PBU to set up the tunnel can happen after successful web authentication.

In certain implementations, a plurality of packets associated with the client are detected by a gating function as a First Sign of Life (FSOL)). The gating function can initiate a session for the client and initiate an interaction with an authentication, authorization, and accounting (AAA) server using an access request. A hypertext transfer protocol (HTTP) request can be received from the client for a uniform resource locator (URL), where a redirect service is provided that changes a destination IP address to a redirected IP address associated with a portal. The response back to the client can include a redirected URL.

Example Embodiments

Figure 1:
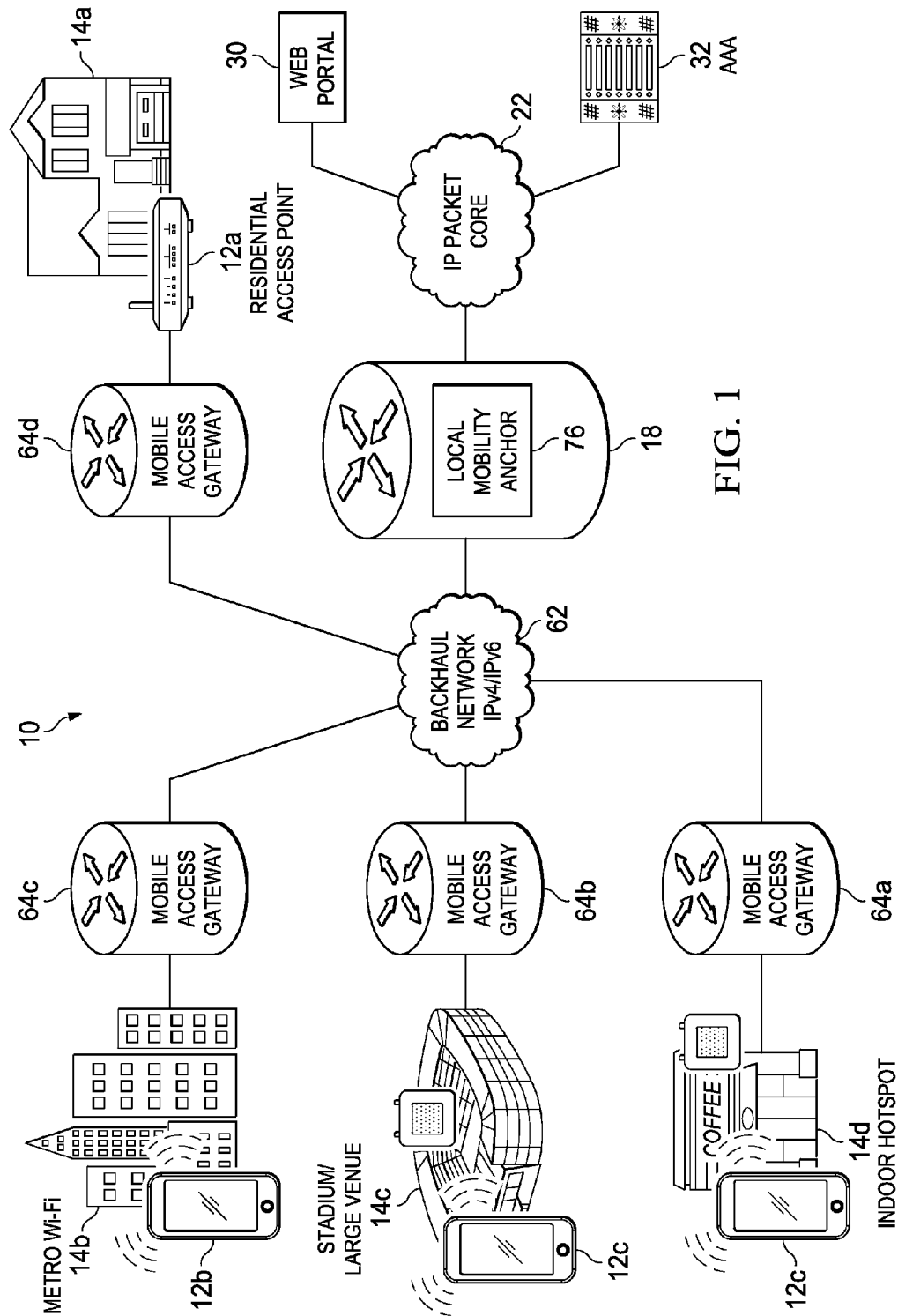
FIG. 1 is a simplified block diagram of a communication system for supporting web authentication in accordance with one embodiment of the present disclosure.

Turning to FIG. 1, FIG. 1 is a simplified block diagram of a communication system 10 for supporting web authentication over a proxy mobile Internet protocol version six (PMIPv6) enabled network in accordance with one embodiment of the present disclosure. Communication system 10 may include clients 12*a-d*, wireless access points (WAPs) 14*a-d*, a backhaul network 62 (e.g., an Internet Protocol (IP) backhaul network), a wireless access gateway (WAG) 18 (or a packet data network gateway (PDN-GW)), an IP packet core 22 (or a general packet radio service network (GPRS)), an authentication, authorization, and accounting (AAA) server 32, and a web portal 30. FIG. 1 also includes a plurality of mobile access gateways (MAGs) 64*a-d* that can be suitably coupled to various entities (e.g., a residential access point, a metro WiFi access point, etc.). WAG 18 includes a local mobility anchor (LMA) 76 in this particular implementation of FIG. 1.

For purposes of illustrating certain example techniques of communication system 10, it is important to understand the communications that may be traversing the network. The following foundational information may be viewed as a basis from which the present disclosure may be properly explained. A large number of WiFi hotspots use a customer web portal to authenticate the user. This form of authentication is referred to as web-authentication (web-auth). The process can operate as follows. First, the client/user connects to the WiFi AP and obtains an IP address through dynamic host configuration protocol (DHCP). The user's traffic is blocked (typically by the default router) except for web traffic that is redirected to a captive portal. The user enters credentials and, on successful authentication, user traffic is unblocked.

As service providers deploy public WiFi, PMIPv6 has been proposed as a mechanism to provide mobility between WiFi APs and potentially between WiFi and 4G. In such cases, there is a MAG in the WiFi domain (at the AP, Wireless local area network (LAN) Controller (WLC), a router next to WLC), and an LMA in the service provider core network. Given the preponderance of web-authentication, a solution to provide web-authentication over a PMIPv6 network is valuable. The key challenge with interworking web-auth for PMIPv6 is that typically, PMIPv6 assumes that the user is authenticated at the Layer 2 level, while in this case, the PMIPv6 session has to be setup such that web authentication can occur.

The client needs an IP address assigned by the LMA (in the home network) for its connectivity after successful authentication. However, that IP address is topologically incorrect when used for web authentication in the access network. If the client obtains an IP address from the access network for web authentication, then this IP address would be topologically incorrect since the traffic needs to be routed via the LMA. This presents a technical dilemma.

One part of the solution of the present disclosure (discussed below) is for the LMA to assign an IP address to the client during PMIP registration (but without a mobility binding entry on the LMA). The client uses this IP address for its session. Until the user is authenticated, the packets are NAT-ed (i.e., source IP address/port is translated) and directed to the captive portal. Once authenticated, the packets can be tunneled between the MAG and the LMA. The client's IP address is topologically correct.

Figure 2:
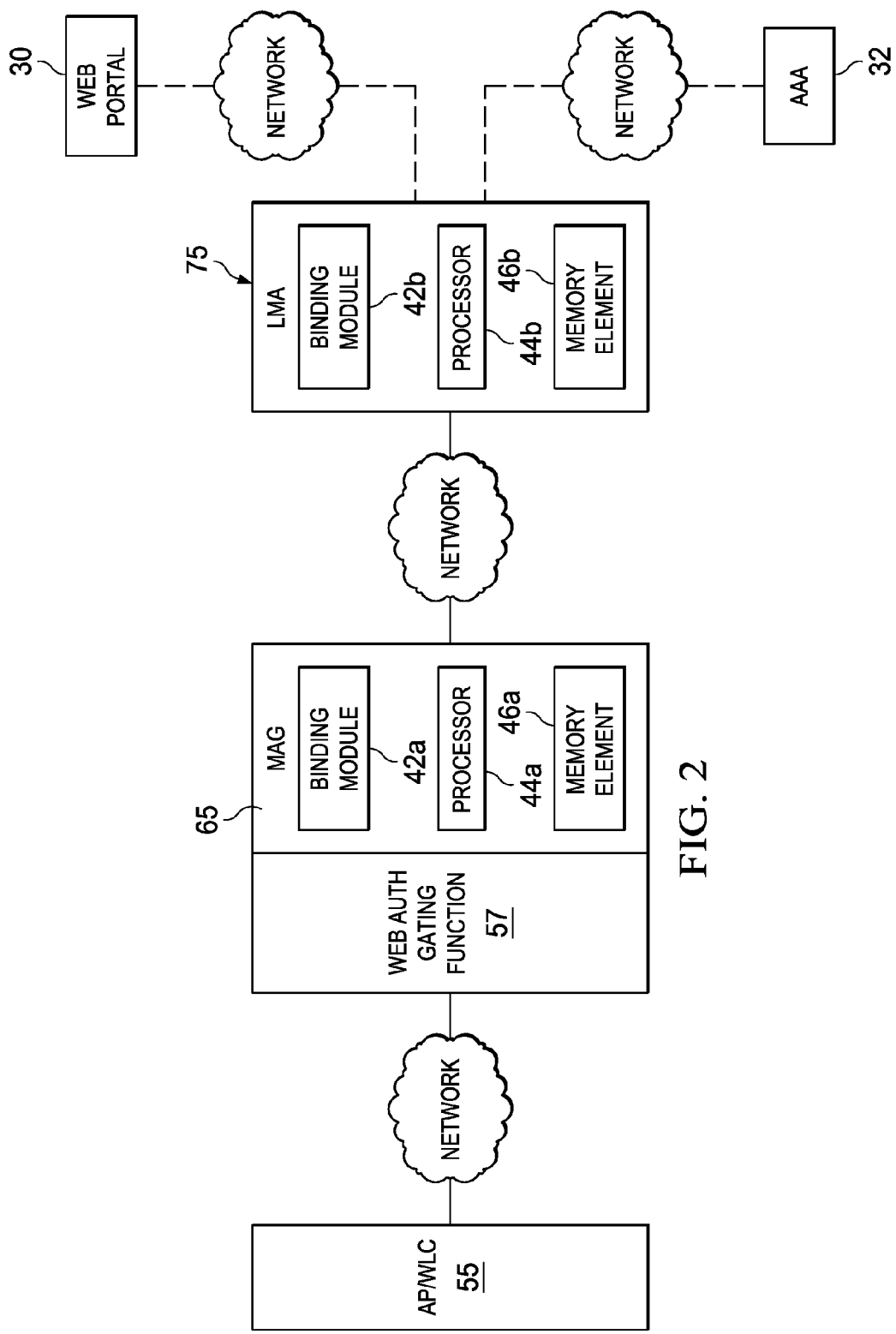
FIG. 2 is a simplified block diagram illustrating possible example details associated with the communication system.

Turning to FIG. 2, FIG. 2 is a simplified block diagram illustrating potential details associated with the present disclosure. In this particular example configuration, the architecture includes an AP/WLC 55 that is coupled to a web authentication gating function 57, which is coupled to a MAG 65. Additionally, the architecture includes an LMA 75 that is coupled to AAA server 32 and to web portal 30 through various networks. MAG 65 includes a binding module 42a, a processor 44a, and a memory element 46a. Similarly, LMA 75 includes a binding module 42b, a processor 44b, and the memory element 46b. In this particular implementation, the MAG is co-located with the web-auth gating function. This function can be responsible for authorizing web-authenticated users. In an alternate implementation, the web auth gating function may be co-located with the LMA.

In accordance with one example implementation, communication system 10 can offer a web authentication for PMIP that can be supported by gating at the access network (i.e., MAG). Additionally, the architecture can avoid resource consumption in the home network (i.e., no Binding Cache Entry (BCE) at the LMA). After authentication is successful, the PMIP tunnel can be established between MAG 65 and LMA 75. The roaming case can meet the need for a successful access authentication in the visited network, before allowing for traffic that is tunneled back to the home network. These activities can avoid setting up PMIP/Generic Routing Encapsulation (GRE) tunnels for unauthenticated users. The architecture can also allow for a denial of service (DoS) on the LMA, which would establish and tear down the data plane due to network attachments that fail access authentication.

In order to further detail the appropriate operations to achieve the teachings of the present disclosure, reference is now made to FIG. 3. FIG. 3 is a simplified flow diagram 300 illustrating example activities associated with an initial connectivity for mobile IP users for a web authentication. The activities in this particular example may involve a Subscriber Management Entity (SME), which may include an AAA instance, along with a portal. The particular flow may begin at 301, where the client initiates the sequence by sending a broadcast DHCP Discover message. The AP/WLC can forward the DHCP Discover message to the MAG. At 302, the MAG constructs a Proxy Binding Update (PBU) with the following attributes: 1) MN-Id; 2) APN name obtained from Access Accept or locally configured; 3) LMA address (IPv4 and IPv6) is obtained from Access Accept or locally configured; 4) IPv4 address set to zero (since this is for initial connectivity); and 5) Handoff Indicator Option of 1 (attachment over a new interface).

At 303, on receiving the PBU, the LMA may optionally contact an external DHCP server to obtain an IP address. Alternately, the LMA may be locally configured with a pool of IP addresses or obtain an IP address from AAA server. The LMA responds with a Proxy Binding Acknowledge (PBA). [In this particular example, there is an assumption concerning usage of an IPv4 address.] The PBA can include: 1) an IPv4 address and subnet mask (IPv4 Home Address Reply Option [note that the S2a specification refers to this is as IPv4 Home Address Acknowledge Option and the Type does not appear to match corresponding option from RFC 5844]); 2) a default IPv4 router (IPv4 Default Router Address Option); 3) DNS server (obtained through PCO IE); and 4) 3GPP IPv6 error code (the MAG can implement appropriate error code processing). At 304, the MAG and the Client exchange DHCP messages (specifically, DHCP Offer from MAG to Client, DHCP Request from Client to MAG, DHCP ACK from MAG to Client). At 305, the MAG and LMA setup a bidirectional tunnel (if one does not exist) for transporting the upstream and downstream traffic for this client/MN. The MAG can support a GRE Key Identifier, as per RFC 5845. As a result, if there is a GRE tunnel between MAG and LMA prior to this client connection, then an additional tunnel setup is not required. A set of upstream and downstream GRE keys negotiated during PBU/PBA is used to mark the upstream and downstream traffic for this mobility session.

At 306, the client's first IP packets are detected by the web-auth gating function (e.g., as a First Sign of Life (FSOL)). The gating function detects any new (or unclassified) media access control (MAC) address and identifies it as a potential new user. At 307, the gating function starts a session and initiates an interaction with the AAA server using an Access Request. The request can include the IP address and MAC address of the user/session. At 308, since this is the initial connectivity for the user, the AAA server responds with an AAA Reject. Further, it installs a L4 Redirect Service to redirect hypertext transfer protocol (HTTP) packets to the portal address. If the user had already been registered, then the AAA server would send an Access Accept message and no Redirect Service would be installed on the MAG.

At 309, the client sends an HTTP Request (to some uniform resource locator (URL)). The destination IP address is modified to the portal address (because of L4 Redirect Service). The packet processing at the MAG is as follows. The redirect service changes the destination IP address to the redirected IP address. As a result, the incoming HTTP Request's destination IP address is modified and, additionally, the modified packet is tunneled to the LMA. The LMA can detunnel the packet and forward it to the portal. At 310, the portal sends a 302 response including the redirected URL. The response is routed by LMA to MAG and subsequently to the client. At 311, the user provides a username, password to the portal in an HTTP secure (HTTPS) session. At 312, the portal communicates with the AAA server and instructs the AAA server to send a Radius change of authentication (CoA) message to authenticate the user credentials. At 313, the gating function can send an Access Request to the AAA server (this could be potentially a different AAA server than the one collocated with the portal).

At 314, the AAA server can respond with an Access Accept if the user is authenticated. At 315, the gating function can send a CoA acknowledgment (ACK) to the portal. The portal can cache the MAC address such that future authorization requests (307) can be addressed. The gating function can also remove the redirect feature. Subsequent IP packet flows are received by the MAG and tunneled to the LMA without any redirection.

There are several issues present in the activities discussed above. First, the bidirectional GRE tunnel is setup prior to user authentication, where traffic from an unauthenticated traffic is routed to the LMA. In the event of a failed authentication, the tunnel has to be torn down. There are potential security risks associated with this approach. This also makes dealing with the roaming scenario more complex. A roaming scenario is one where the client is in a visited network (AP/WLC is in the visited N/W), but the LMA resides in the home network. The visited network may want to provide the captive portal. As per the activities discussed above, this would require the traffic to be routed from the LMA (in the home network) back to the portal in the visited network. Beyond the circuitous routing issue, there be may be additional challenges if the portal is in a private (visited) network and not reachable from the home network.

Turning to FIG. 4, FIG. 4 is a simplified flow diagram 400 illustrating potential activities associated with present disclosure. More particularly, the illustration of FIG. 4 offers a modified web authentication process in accordance with one example embodiment. At 401, the client initiates the sequence by sending a broadcast DHCP Discover message. [Note that the broad term 'discover message' includes any type of network message being sent between two network elements.] The AP/WLC forwards the DHCP Discover message to the MAG. At 402, the MAG can determine that this is an unauthenticated user. (The gating function can identify this based on the MAC address.) The MAG can send a PBU with a new option type (binding type with a value of temporary). The MAG can also not request any GRE encapsulation (GRE Key Option can be omitted). The other parameters in the PBU are similar to those described above. At 403, on receiving the PBU, the LMA can respond as described previously, except that no GRE encapsulation identifiers can be provided in the PBA. The activities of 404-407 are the same as those discussed previously, where at the end of 407, the gating function can install a NAT service in addition to the redirect service.

At 408, the client sends an HTTP Request (to some URL). The destination IP address is modified to the portal address (because of the L4 Redirect Service). Subsequently, the source IP address is NAT-ed to a local IP address by the gating function and the packet is forwarded to the redirected IP address. Note that this is different from above (in FIG. 3), where the redirected packet was tunneled to the LMA (without NAT-ing).

The activities of 409-414 are generally the same as discussed previously, except that packets to/from the client are NAT-ed by the gating function. At 415, subsequent to sending a CoA ACK, the MAG can confirm the temporary PMIP binding it had established in 403 and 404. Specifically, the PBU can contain the IP address received from the LMA in 404 and the PBU can include the GRE key option for GRE encapsulation. At 416, the PBA can confirm the PMIP binding and can include the GRE encapsulation identifiers. At 417, a bidirectional tunnel is setup. In cases where a tunnel exists between LMA and MAG this activity can involve associating unique uplink and downlink GRE key identifiers with this session. This particular flow can conclude, where subsequent IP packets are not blocked at the MAG. Packets can be tunneled to the LMA.

In terms of the infrastructure of the present disclosure, clients 12*a-d* can be associated with clients, customers, endpoints, handheld devices, or end users wishing to initiate a communication in communication system 10 via some network. The term 'client' is inclusive of devices used to initiate a communication, such as a receiver, a computer, a set-top box, an Internet radio device (IRD), a cell phone, a smart phone, a tablet, a personal digital assistant (PDA), customer premise equipment (CPE), or any other device, component, element, or object capable of initiating voice, audio, video, media, or data exchanges within communication system 10. Clients 12*a-d* may also be inclusive of a suitable interface to the human user, such as a display, a keyboard, a touchpad, a remote control, or other terminal equipment. Clients 12*a-d* may also be any device that seeks to initiate a communication on behalf of another entity or element, such as a program, a database, or any other component, device, element, or object capable of initiating an exchange within communication system 10. Data, as used herein in this document, refers to any type of numeric, voice, video, media, or script data, or any type of source or object code, or any other suitable information in any appropriate format that may be communicated from one point to another.

WAPs 14*a-d* are configured to connect one or more clients 12*a-d* to a network (e.g., first network 62). WAPs 14*a-d* may resemble a network hub, relaying data between connected wireless devices (e.g., clients 12*a-d*) in addition to a connected wired device, most often an Ethernet hub, or switch. Thus, allowing wireless devices to communicate with other wired and wireless devices.

The networks of FIGS. 1-2 represent a series of points or nodes of interconnected communication paths for receiving and transmitting packets of information that propagate through the architecture. The networks can each offer a communicative interface between sources and/or hosts, and each may be any local area network (LAN), wireless local area network (WLAN), metropolitan area network (MAN), Intranet, Extranet, WAN, virtual private network (VPN), or any other appropriate architecture or system that facilitates communications in a network environment. The architecture of the present disclosure may include a configuration capable of transmission control protocol/internet protocol (TCP/IP) communications for the transmission and/or reception of packets in a network. The architecture of the present disclosure may also operate in conjunction with a user datagram protocol/IP (UDP/IP) or any other suitable protocol, where appropriate and based on particular needs.

The networks may implement a UDP/IP connection and use a TCP/IP communication language protocol in particular embodiments of the present disclosure. Further, the networks may implement any other suitable communication protocol for transmitting and receiving data packets within the architecture. Data, as used herein in this document, refers to any type of numeric, voice, video, media, or script data, or any type of source or object code, or any other suitable information in any appropriate format that may be communicated from one point to another.

Backhaul network 62 may be an Internet Protocol (IP) backhaul network that comprises intermediate links between a core network, or backbone, of the network and the small sub-networks at the "edge" of a hierarchical network. Backhaul network 62 may be configured to transmit from a remote site or network to a central or main site and may include a high-capacity line; for example, to backhaul from a wireless mesh network to the wired network by aggregating the traffic on the wireless mesh over one or more high-speed lines to a private network or the Internet. IP packet core 22 (e.g., an IP packet core network or an general packet radio service network (GPRS)) may be a packet oriented mobile data service on a 2G and 3G cellular communication system's global system for mobile communications (GSM). IP packet core 22 may be a GPRS core network and allow 2G, 3G and WCDMA mobile networks to transmit IP packets to external networks such as the Internet.

WAG 18, local mobility anchor 76, and the PDN-GW are network elements that can facilitate the authentication activities discussed herein. As used herein in this Specification, the term 'network element' is meant to encompass any of the aforementioned elements, as well as routers, switches, APs, cable boxes, gateways, bridges, a GPRS support node (GGSN) loadbalancers, firewalls, inline service nodes, proxies, servers, processors, modules, or any other suitable device, component, element, proprietary appliance, or object operable to exchange information in a network environment. These network elements may include any suitable hardware, software, components, modules, interfaces, or objects that facilitate the operations thereof. This may be inclusive of appropriate algorithms and communication protocols that allow for the effective exchange of data or information.

In one implementation, local mobility anchors 75/76 and/or MAGs 64*a-d*/65 include software to achieve (or to foster) the authentication activities discussed herein. This could include the implementation of instances of binding modules 42*a-b*. Additionally, each of these elements can have an internal structure (e.g., a processor, a memory element, etc.) to facilitate some of the operations described herein. In other embodiments, these authentication activities may be executed externally to these elements, or included in some other network element to achieve the intended functionality. Alternatively, local mobility anchors 75/76 and/or MAGs 64*a-d*/65 may include software (or reciprocating software) that can coordinate with other network elements in order to achieve the authentication activities described herein. In still other embodiments, one or several devices may include any suitable algorithms, hardware, software, components, modules, interfaces, or objects that facilitate the operations thereof.

Hence, a network element (e.g., a gateway, an LMA, etc.) can include software to achieve the authentication management operations, as outlined herein in this document. In certain example implementations, the authentication management functions outlined herein may be implemented by logic encoded in one or more tangible non-transitory media (e.g., embedded logic provided in an application specific integrated circuit [ASIC], digital signal processor [DSP] instructions, software [potentially inclusive of object code and source code] to be executed by a processor [processors 44*a-b* shown in FIG. 2], or other similar machine, etc.). In some of these instances, a memory element [memory element 46*a-b* shown in FIG. 2] can store data used for the operations described herein. This includes the memory element being able to store software, logic, code, or processor instructions that are executed to carry out the activities described in this Specification. The processor (e.g., processor 44*a-b*) can execute any type of instructions associated with the data to achieve the operations detailed herein in this Specification.

In one example, the processor could transform an element or an article (e.g., data) from one state or thing to another state or thing. In another example, the activities outlined herein may be implemented with fixed logic and/or programmable logic (e.g., software/computer instructions executed by the processor) and the elements identified herein could be some type of a programmable processor, programmable digital logic (e.g., a field programmable gate array [FPGA], an erasable programmable read only memory (EPROM), an electrically erasable programmable ROM (EEPROM)) or an ASIC that includes digital logic, software, code, electronic instructions, or any suitable combination thereof.

Any of these elements (e.g., the network elements, etc.) can include memory elements for storing information to be used in achieving the authentication activities as outlined herein. Additionally, each of these devices may include a processor that can execute software or an algorithm to perform the authentication management activities as discussed in this Specification. These devices may further keep information in any suitable memory element [random access memory (RAM), ROM, EPROM, EEPROM, ASIC, etc.], software, hardware, or in any other suitable component, device, element, or object where appropriate and based on particular needs. Any of the memory items discussed herein should be construed as being encompassed within the broad term 'memory element.' Similarly, any of the potential processing elements, modules, and machines described in this Specification should be construed as being encompassed within the broad term 'processor.' Each of the network elements can also include suitable interfaces for receiving, transmitting, and/or otherwise communicating data or information in a network environment.

Note that with the examples provided above, interaction may be described in terms of two, three, or four network elements. However, this has been done for purposes of clarity and example only. In certain cases, it may be easier to describe one or more of the functionalities of a given set of flows by only referencing a limited number of network elements. It should be appreciated that communication system 10 (and its teachings) are readily scalable and, further, can accommodate a large number of components, as well as more complicated/sophisticated arrangements and configurations. Accordingly, the examples provided should not limit the scope or inhibit the broad teachings of communication system 10, as potentially applied to a myriad of other architectures.

It is also important to note that the steps in the preceding FIGURES illustrate only some of the possible scenarios that may be executed by, or within, communication system 10. Some of these steps may be deleted or removed where appropriate, or these steps may be modified or changed considerably without departing from the scope of the present disclosure. In addition, a number of these operations have been described as being executed concurrently with, or in parallel to, one or more additional operations. However, the timing of these operations may be altered considerably. The preceding operational flows have been offered for purposes of example and discussion. Substantial flexibility is provided by communication system 10 in that any suitable arrangements, chronologies, configurations, and timing mechanisms may be provided without departing from the teachings of the present disclosure.

Additionally, any AP (e.g., a microcell, picocell, femtocell, or other small cell base station, for example) could be used in conjunction with the present disclosure. Any AP that is generally responsible for providing an air interface to a mobile client could benefit from the teachings of the present disclosure. Certain small cell network environments that are applicable may involve WiFi, WiMAX, and LTE strand-mounted systems, which rely on a particular link over a particular infrastructure.

In addition, although the present disclosure has been described with reference to particular communication exchanges involving certain backhaul links, AAA, and authentication protocols, communication system 10 may be applicable to other exchanges, routing protocols, authentication protocols, or routed protocols in which packets (not necessarily the routing protocol/packets described) are exchanged in order to provide for a proper authentication in the context of client activities.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 as it exists on the date of the filing hereof unless the words "means for" or "step for" are specifically used in the particular claims; and (b) does not intend, by any statement in the specification, to limit this disclosure in any way that is not otherwise reflected in the appended claims.

What is claimed is:

1. A method, comprising:
   receiving a discover message for a client over a network;
   determining that the discover message is associated with an unauthenticated user associated with the client;
   communicating a proxy binding update (PBU) including an identity of the client and having a binding type value set to a temporary status, which indicates establishing a temporary proxy mobile Internet protocol (PMIP) binding for the client;
   establishing a bidirectional tunnel for transporting traffic for the client if the user associated with client is authenticated; and
   confirming the temporary PMIP binding previously established for the client by communicating a subsequent PBU, wherein the subsequent PBU includes an Internet protocol (IP) address previously received for the client.

2. The method of claim 1, wherein the subsequent PBU includes a Generic Routing Encapsulation (GRE) key option for GRE encapsulation.

3. The method of claim 1, wherein a set of upstream and downstream keys are used to mark upstream and downstream traffic for a mobility session associated with the client.

4. The method of claim 1, wherein the determination of the discover message being associated with the unauthenticated user associated with the client involves identifying a media access control (MAC) address.

5. The method of claim 1, wherein a plurality of packets associated with the client are detected by a gating function as a First Sign of Life (FSOL).

6. The method of claim 5, wherein the gating function initiates a session for the client and initiates an interaction with an authentication, authorization, and accounting (AAA) server using an access request.

7. The method of claim 1, further comprising:
   receiving a hypertext transfer protocol (HTTP) request by a gating function for a uniform resource locator (URL);
   providing a redirect service that changes a destination IP address to a redirected IP address associated with a portal; and
   providing a network address translation (NAT) service that translates a source IP address received for the client to a local IP address of the gating function.

8. The method of claim 7, further comprising:
   providing a response for the HTTP request to the client, wherein the response includes a redirected URL.

9. Logic encoded in non-transitory media that includes code for execution and when executed by a processor operable to perform operations, comprising:
   receiving a discover message for a client over a network;
   determining that the discover message is associated with an unauthenticated user associated with the client;
   communicating a proxy binding update (PBU) including an identity of the client and having a binding type value set to a temporary status, which indicates establishing a temporary proxy mobile Internet protocol (PMIP) binding for the client;
   establishing a bidirectional tunnel for transporting traffic for the client if the user associated with client authenticated; and
   confirming the temporary PMIP binding previously established for the client by communicating a subsequent PBU, wherein the subsequent PBU includes an Internet protocol (IP) address previously received for the client.

10. The logic of claim 9, wherein the subsequent PBU includes a Generic Routing Encapsulation (GRE) key option for GRE encapsulation.

11. The logic of claim 9, wherein a set of upstream and downstream keys are used to mark upstream and downstream traffic for a mobility session associated with the client.

12. The logic of claim 9, wherein the determination of the discover message being associated with the unauthenticated user associated with the client involves identifying a media access control (MAC) address.

13. The logic of claim 9, the operations further comprising:
    receiving a hypertext transfer protocol (HTTP) request by a gating function for a uniform resource locator (URL);
    providing a redirect service that changes a destination IP address to a redirected IP address associated with a portal; and
    providing a network address translation (NAT) service that translates a source IP address received for the client to a local IP address of the gating function.

14. The logic of claim 13, the operations further comprising:
    providing a response for the HTTP request to the client, wherein the response includes a redirected URL.

15. A network element, comprising:
    a memory element configured to store data;
    a processor operable to execute instructions associated with the data; and
    a binding module operable to interface with the processor such that the network element is configured to:
       receive a discover message for a client over a network;
       determine that the discover message is associated with an unauthenticated user associated with the client;
       communicate a proxy binding update (PBU) including an identity of the client and having a binding type value set to a temporary status, which indicates establishing a temporary proxy mobile Internet protocol (PMIP) binding for the client;
       establish a bidirectional tunnel for transporting traffic for the client if the user associated with the client is authenticated; and confirm the temporary PMIP binding previously established for the client by communicating a subsequent PBU, wherein the subsequent PBU includes an Internet protocol (IP) address previously received for the client.

16. The network element of claim 15, wherein the subsequent PBU includes a Generic Routing Encapsulation (GRE) key option for GRE encapsulation, and wherein a set of upstream and downstream keys are used to mark upstream and downstream traffic for a mobility session associated with the client.

17. The network element of claim 15, wherein a plurality of packets associated with the client are detected by a gating function as a First Sign of Life (FSOL), and wherein the gating function initiates a session for the client and initiates an interaction with an authentication, authorization, and accounting (AAA) server using an access request.

* * * * *